Dec. 10, 1929.  B. J. BABBITT  1,739,277
APPARATUS FOR MEASURING THE PERMEABILITY OF MAGNETIC MATERIALS
Filed July 1, 1926
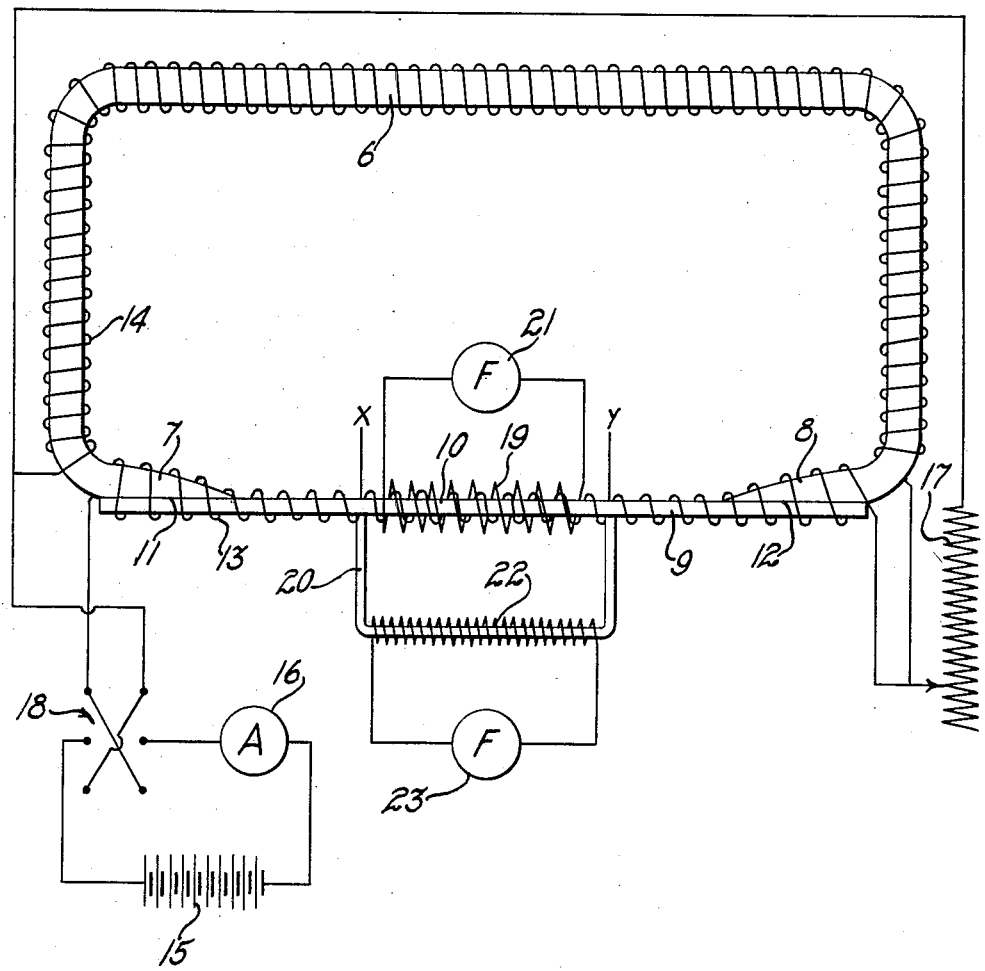
Inventor
Bethel J. Babbitt
by *Ha Latium*
Att'y.

Patented Dec. 10, 1929

1,739,277

UNITED STATES PATENT OFFICE

BETHEL JAY BABBITT, OF RIVERSIDE, ILLINOIS, ASSIGNOR TO WESTERN ELECTRIC COMPANY, INCORPORATED, OF NEW YORK, N. Y., A CORPORATION OF NEW YORK

APPARATUS FOR MEASURING THE PERMEABILITY OF MAGNETIC MATERIALS

Application filed July 1, 1926. Serial No. 119,928.

This invention relates to apparatus for measuring the permeability of magnetic materials, and more particularly to apparatus for measuring the permeability of highly magnetizable materials such as metals of the nickel-iron series and similar materials.

The development in recent years of magnetic materials in which the permeability rises to values in the vicinity of 75,000 was followed by the discovery that many of the methods formerly employed in determining the permeability of materials could not be applied with any degree of success to materials of this kind.

It is an object of the present invention to provide an instrument which will accurately determine the permeability of a wide range of magnetic materials.

The invention contemplates the provision of means for reproducing in a rod or bar the same conditions as would exist if the rod or bar were bent into an annulus and its ends brought together so as to be at the same magnetic potential. In accordance with one embodiment of the invention, the piece of material to be tested forms part of a magnetic circuit in which the magnetic potential difference across the element to be tested may be made zero. The permeability of the element may then be determined by noting the magnetic induction in the element for a given value of current in a coil surrounding the element in the same manner as if the well known ballistic ring method were employed.

It is believed that a better understanding of the invention may be had by reference to the following description taken in conjunction with the accompanying drawing which illustrates an embodiment of the invention.

Referring to the drawing, the apparatus comprises a yoke 6 illustrated of substantially rectangular form but which may be circular or of any other suitable form and preferably of easily magnetizable material, such as a nickel iron alloy. On one side of the rectangle there is a gap between ends 7 and 8 of the yoke. The gap is bridged by a bar 9 whose permeability is to be determined, completing the magnetic circuit. The yoke ends are provided with large faces 11 and 12 to contact with the test specimen for the purpose of reducing the reluctance at these points to a minimum. The non-contacting surfaces of the yoke ends are tapered until they meet the surfaces of the test specimen to avoid the formation of magnetic poles at these points.

The magnetic circuit is wound with two magnetizing coils, a main magnetizing coil 13 and an auxiliary magnetizing coil 14. These coils are wound in such a direction that the fluxes set up by them are cumulative and they are energized by a direct current source 15. The circuit may be traced from the direct current source through an ammeter 16 to the main magnetizing coil. From the main magnetizing coil the current passes in parallel through the auxiliary magnetizing coil and a variable resistance 17. By means of the variable resistance the amount of current through the auxiliary coil may be varied relative to the main coil. The electric circuit is provided with a double throw switch 18 for the purpose of changing the direction of flow of the current through the coils.

In determining the permeability of the test specimen, only an element 10 thereof between the points $x$ and $y$ is tested. This element is surrounded by a coil 19 whose terminals are connected to a fluxmeter 21 which is simply a ballistic galvanometer calibrated to indicate flux. The element to be tested is spanned by a magnetic bridge or shunt 20 preferably consisting of a very high permeability nickel iron alloy. The magnetic shunt is wound with a coil 22 whose terminals are connected to a fluxmeter 23. The main magnetizing coil 13 and the coil 19 may be arranged so as to form a tube to readily permit insertion of the test specimen.

The operation of the instrument is as follows: The switch 18 is closed and the fluxmeter 23 is observed to note whether there is any deflection of the indicator. If there is a deflection of the indicator the resistance 17 is adjusted until there is no deflection upon the closing of the switch. The fact that there is no deflection of the indicator upon closing the switch signifies that no flux passes through the magnetic shunt whose variation would induce an electromotive force in the winding 22 when the switch is closed and therefore there is no difference in the magnetic potential along the test specimen between the points $x$ and $y$. In other words the currents in the main and auxiliary windings have been so adjusted that the magnetomotive force developed by the current in the magnetizing coil 13 between the points $x$ and $y$ exactly balances the drop in the magnetic potential between these points. This may be expressed mathematically by the equation $$M.M.F. = A\pi NI = \theta R$$

where N is the number of turns of the winding 13 between $x$ and $y$, I the current in amperes, $\theta$ the total flux in maxwells, and R the reluctance of the magnetic path in oersteds.

When the above relation obtains, the condition of the element 10 is the same as if its ends were bent together and in contact producing zero potential difference between them and it is evident that the entire magnetic flux in the element 10 is then produced by the magnetomotive force between the points $x$ and $y$. The magnetomotive force is a constant times the current which may be read from the ammeter 16. The magnetic flux is measured by its inductive effect upon the winding 19 when the current is interrupted and is indicated by the fluxmeter 21. The fluxmeter 21 may therefore be calibrated to read directly the magnetic flux for a given current.

In practice, instead of merely interrupting the electric circuit to obtain a reading it is customary to reverse the current by the switch 18 in order to avoid the error which might be caused by hysteresis. The fluxmeter 21 must then be set to indicate one-half the value indicated when the circuit is merely interrupted.

The invention makes it possible to use a magnetic circuit whose peripheral dimensions are large as compared to its cross-section which has the effect of making the dimensions of an inner element approximately the same as the dimensions of an outer element so that the flux path has approximately the same length throughout, giving more accurate results without the necessity of using a large piece of material as a test specimen.

It will be understood that the embodiment of the invention herein described and illustrated is merely a convenient and useful form of the invention, which is capable of many other modifications without departing from the spirit and scope of my invention.

What is claimed is:

1. In an apparatus for determining the permeability of magnetic materials, means extending the entire length of a specimen to be tested for placing the specimen in a magnetic circuit, means for developing a magnetomotive force through the circuit, means for balancing the magnetomotive force across an element of the test specimen with the magnetic potential drop across the element, means for determining the magnetomotive force across the element, and means for determining the magnetic induction in the element.

2. In an apparatus for determining the permeability of magnetic materials, a magnetic circuit, and means for determining the potential difference of two points on said circuit comprising a nickel-iron alloy bridge, a coil wound on said bridge, and indicating means for indicating the magnetic potential difference between said points.

3. In an apparatus for determining the permeability of magnetic materials, a yoke, a coil extending from end member to end member of the yoke for magnetizing the specimen to be tested, means for balancing the magnetization of a central element of the specimen with the magnetic potential drop across the element, and means removed from the ends of and surrounding the magnetizing coil for determining the magnetization of said element when the balanced condition exists.

4. In an apparatus for determining the permeability of magnetic materials, a magnetic yoke adapted to contact with the ends of a specimen, means for developing a magnetomotive force equal to the average magnetic potential drop in the yoke, means for developing a magnetomotive force equal to the average magnetic potential drop in the specimen to be tested, and means for determining the magnetic induction of the specimen for a given magnetomotive force.

5. In an apparatus for determining the permeability of magnetic materials, a yoke of magnetic material for contacting with the specimen to be tested and provided with contact surfaces of larger area than the cross section of the yoke, means for developing a magnetomotive force in the specimen, and means for determining the magnetic induction in the specimen.

6. In an apparatus for determining the permeability of magnetic materials, a yoke of magnetic material, a tapered end member on said yoke for contacting with the specimen to be tested and provided with a contacting area of larger cross section than the end member, means for developing a magnetomotive force in the yoke, means for developing a magnetomotive force in the specimen, and means for determining the magnetic induction in the specimen.

7. In an apparatus for determining the permeability of magnetic materials, a magnetic yoke, a winding for developing a magnetomotive force equal to the magnetic potential drop in the yoke, a winding for developing a magnetomotive force equal to the magnetic potential drop in the specimen, and a winding overlapping the last mentioned winding for determining the magnetic induction in the specimen.

8. In an apparatus for determining the permeability of magnetic materials, a magnetic yoke, a winding for developing a magnetomotive force in the yoke, a winding extending from end member to end member of the yoke for developing a magnetomotive force in the specimen to be tested, and a winding for determining the magnetic induction in the specimen located centrally of the last mentioned winding.

In witness whereof, I hereunto subscribe my name this 21 day of June A. D., 1926.

BETHEL JAY BABBITT.